United States Patent [19]

Concannon et al.

[11] Patent Number: 5,420,944

[45] Date of Patent: * May 30, 1995

[54] TECHNIQUES FOR ALIGNING, FOCUSING AND NORMALIZING IMAGING SYSTEM

[75] Inventors: David J. Concannon, Farmington Hills; Gary B. Copenhaver, Canton; Clive E. Catchpole, Birmingham, all of Mich.

[73] Assignee: Unisys Corporation, Blue Bell, Pa.

[*] Notice: The portion of the term of this patent subsequent to Nov. 26, 2008 has been disclaimed.

[21] Appl. No.: 181,485

[22] Filed: Jan. 14, 1994

Related U.S. Application Data

[60] Continuation of Ser. No. 790,901, Nov. 12, 1991, abandoned, which is a division of Ser. No. 532,691, Jun. 4, 1990, Pat. No. 5,068,912.

[51] Int. Cl.$^6$ ............................................. G06K 9/20
[52] U.S. Cl. .................................. 382/317; 250/560; 356/381; 358/406; 358/475; 382/295
[58] Field of Search .................... 382/61, 45; 358/406, 358/475; 37/386, 641, 707; 356/243, 443, 124.5, 381, 371; 250/206, 201.7, 252.1, 560

[56] References Cited

U.S. PATENT DOCUMENTS

| | | | |
|---|---|---|---|
| 4,068,912 | 11/1981 | Concannon et al. | 382/61 |
| 4,464,681 | 8/1984 | Jacobs et al. | 358/406 |
| 4,623,938 | 11/1986 | Asano et al. | 358/406 |
| 4,751,376 | 6/1988 | Sugiura et al. | 358/406 |
| 4,912,567 | 3/1990 | Nakajima et al. | 358/475 |

Primary Examiner—Joseph Mancuso
Attorney, Agent, or Firm—John J. McCormick; Mark T. Starr

[57] ABSTRACT

A set of track gauges for use in aligning, focussing and normalizing an imaging system of a high speed document processor have been provided. Each of the gauges fit within a track (14) in front of the imaging system (10 or 12). The depth gauge (70) is used to align the secondary light beam (26) with the primary light beam (22) so that all documents passing through the track (14) will be evenly illuminated from two points symmetrically offset from a line normal to the track (14). In addition, the depth gauge (70) is used to align a normally reflected beam (32) with a photodetector array (56). Two different trunnion mirrors (54 and 28) are adjusted in the two different alignment operations. The focussing gauge (80) includes a set of black 87 and white 88 stripes positioned on a middle region 86. The white reference gauge (90) has a reflective white coating in its middle region 96. An oscilloscope (100, 210, 300, or 400) is used to display the intensity of reflected light (32) impinging on the photodetector array (56) during all optical alignment and focussing operations.

7 Claims, 7 Drawing Sheets

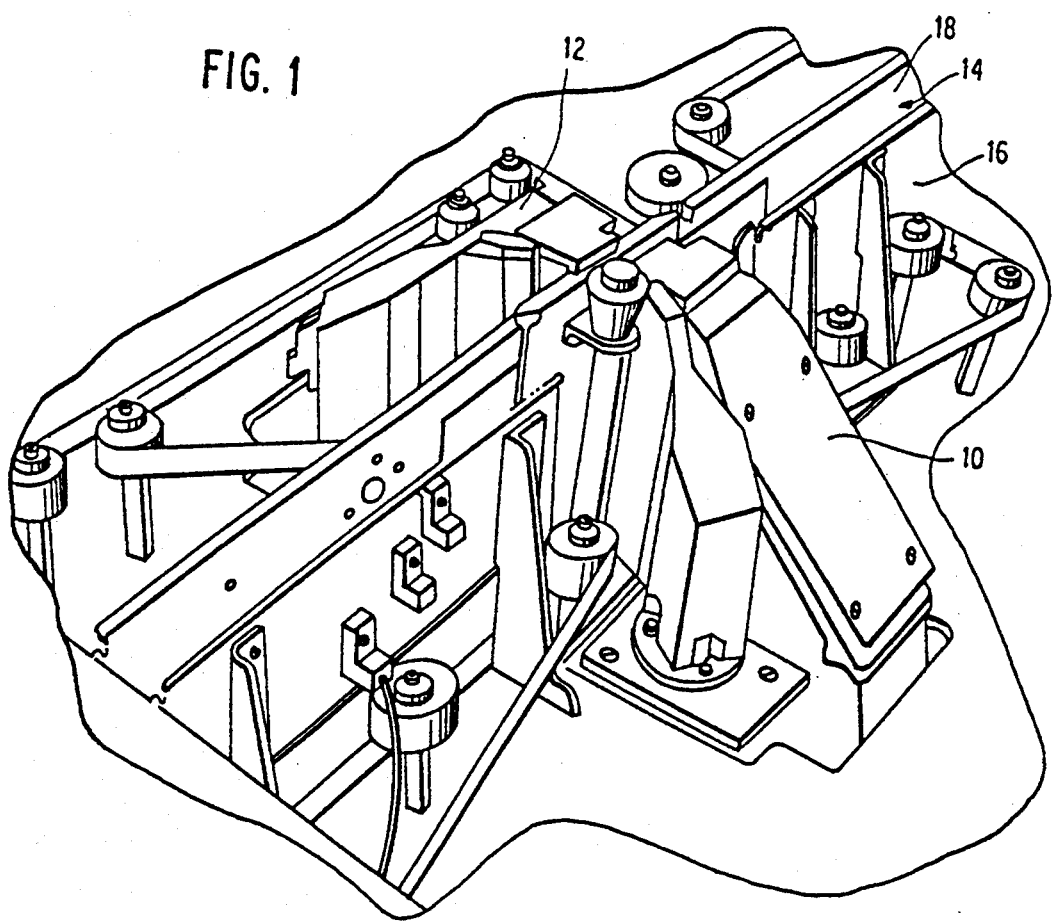

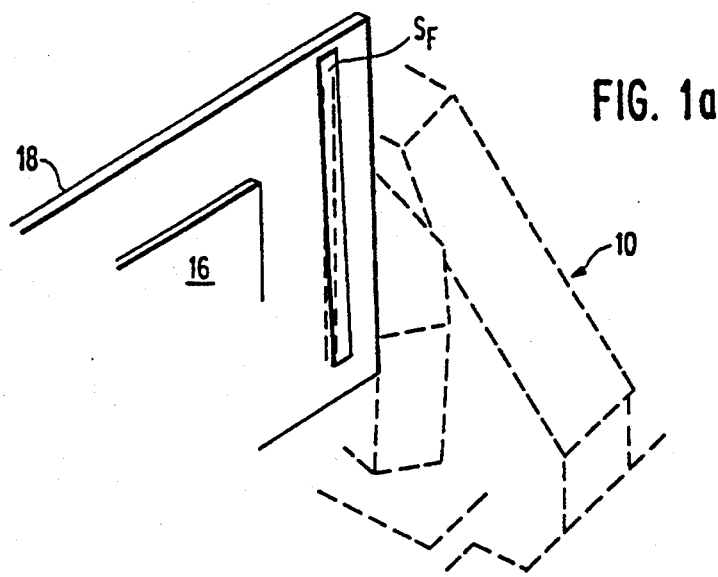

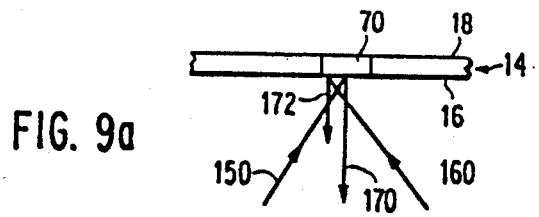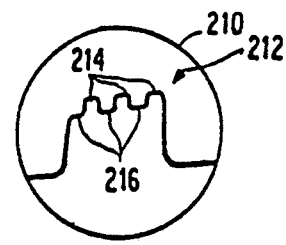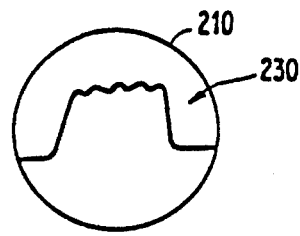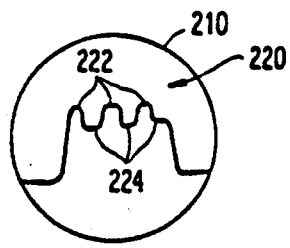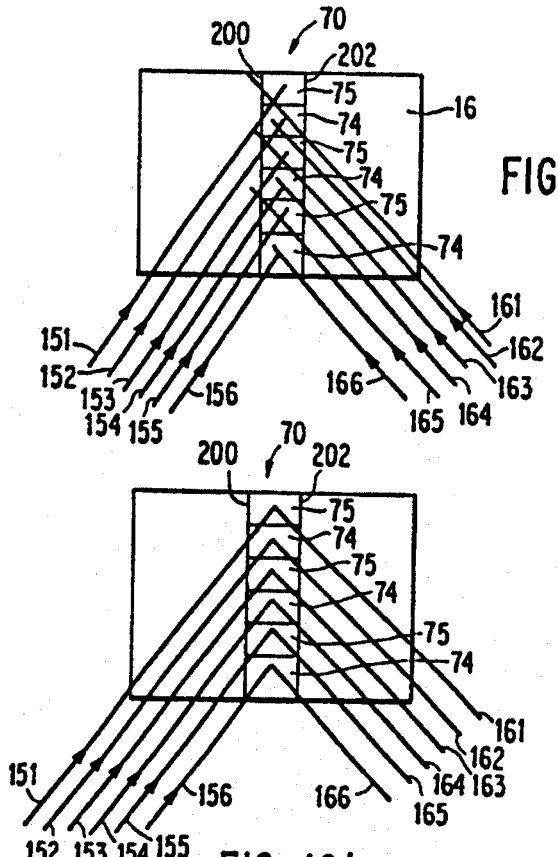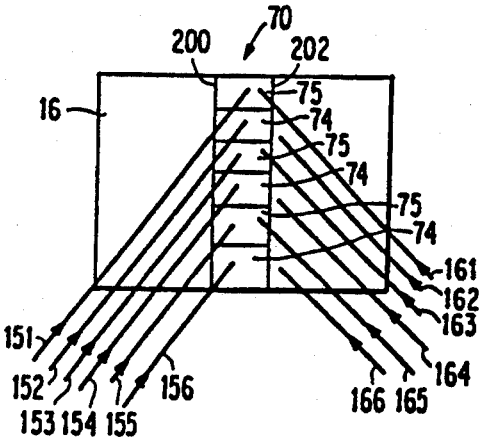

TECHNIQUES FOR ALIGNING, FOCUSING AND NORMALIZING IMAGING SYSTEM

CROSS-REFERENCE TO RELATED APPLICATIONS

This application is a continuation of patent application Ser. No. 07/790,901, filed Nov. 12, 1991, now abandoned, which, in turn, is a Division of our U.S. Ser. No. 07/532,691, filed Jun. 4, 1990, and now issued as U.S. Pat. No. 5,068,912.

This application is related to the co-pending U.S. Patent application entitled "Electronic Image Lift" which was filed on Oct. 10, 1989 and has Ser. No. 419,574. The above-identified application is assigned to a common assignee and is herein incorporated by reference.

DESCRIPTION

BACKGROUND OF THE INVENTION

1. Field of the Invention

The present invention generally relates to high speed document handling systems and, more specifically, to a method and a set of gauges for aligning and focusing the imaging devices used in a high speed document handling system.

2. Description of the Prior Art

High speed document handling systems are used to quickly capture and store information present on the surfaces of a document. After the information has been captured, the information can be processed at remote Stations without physically transferring the document. High speed document handling systems have been in use in the banking industry to process checks, in the credit industry to process credit card receipts, and in wholesale and retail operations to process remittance documents.

Early automated document handling systems required the documents to contain coded data which could be read by a bar code reader or similar device. Because many documents are handwritten, document handling systems which rely on coded information have limited utility.

Recently, much effort has been made to adapt image capturing and character recognition schemes for use in a high speed document handling system. In operation, a document is imaged using a light source to illuminate the document and a photodetector or camera array to receive light reflected from the document as the document is moved through a track past the imaging station at high speed. After the document has been imaged, the signals from the photodetector or camera array can be analyzed to determine and store the information on the document.

Correct operation of the imaging system is critical to the performance of any high speed document handling system. Improper alignment of the light sources and the photodetector array and/or improper focussing of the light will reduce the intensity of light received by the photodetector array and make the information on the document indistinguishable from background noise. In the past, it has been the practice to merely drop a piece of white paper within the track of the document handling system and to adjust the optics to maximize the peak signal output from the photodetector array. This method of alignment and focussing leads to mixed results since there is no control over the precise placement of the white paper within the track. In one calibration run, the white paper may be positioned closer to the front wall of the track while in another calibration run, the white paper may be positioned closer to the rear wall of the track. In addition, the white paper could be positioned at an angle within the track. Without knowing the precise position of the white paper in the track, a technician is liable to set the light output too high such that information received by the photodetector will be lost because of saturation of the analog to digital (A/D) converter.

SUMMARY OF THE INVENTION

It is therefore an object of this invention to provide a set of gauges which enable a technician to properly and repeatably align and focus the imaging system of a high speed document handling system.

According to the invention, three gauges are used by the technician for aligning, focusing and normalizing an imaging system in a high speed document handling system. In a preferred embodiment, the document handling system has two imaging systems which image opposite sides of the document as it travels through the track. The imaging systems optically interact with the document through window slots in the track. Preferably, the Window slots in the front and rear of the track are offset so that illumination light from the front side of the track does not interfere with the light reflected from the back side of a document to the back side imaging system.

Typically, an imaging system includes three beams of light. Two beams of light illuminate documents in the track through the window in the track wall and one beam of light is reflected from the document back through the window in the track wall to a photodetector array. The illuminating beams are rectangular in shape and may be supplied by an optical fiber array. The window in the track is rectangular and is large enough to view a portion of the document from its top to its bottom. The two beams of light used to illuminate the document are symmetrically offset from a path normal to the track. Illumination from two symmetrically offset points is preferred since this arrangement reduces shadowing effects caused by wrinkles in the document which would mask information on the face of the document.

In order for the imaging system to work correctly, all three beams need to be aligned. Alignment is achieved using a depth gauge. The depth gauge is rectangular in shape where the height and width dimensions are large enough to cover the entire window in the track wall. The thickness of the depth gauge at its top, bottom and side edges is sized to fit snugly within the track, i.e., the thickness is ideally equivalent to the distance between the front and rear walls of the track. In the middle portion of the depth gauge, the thickness is varied in a horizontal stripe pattern extending up its height to create two sets of plateau regions. One set of plateau regions has a thickness a fixed amount less than half the thickness of the depth gauge and the other set of plateau regions has a thickness that same fixed amount more than half the thickness of the .depth gauge. As an illustrative example, the track is eighty thousandths of an inch (mils) wide; therefore, the top, bottom, and side edges of the depth gauge are 80 mils thick. The first and second set of plateaus must be at thicknesses equidistant from the centerpoint of 40 mils; therefore, the first set of plateaus having a thickness of 20 mils and the second set of plateaus having a thickness of 60 mils would be satisfactory. It is anticipated that the sets of plateau regions could be varied by having the plateaus in one set of the plateau regions have graduated thicknesses less than half the thickness of the depth gauge where the plateaus in the other set of plateau regions have corresponding graduated thicknesses more than half the thickness of the depth gauge. Each set of plateau regions has a white reflective coating for reflecting the illuminating light.

Alignment of the three beams is achieved by adjustment of a pair of mirrors. The depth gauge is placed in the track in front of the window in the track wall. An oscilloscope is connected to the output of the photodetector array. A technician makes rotating adjustments, as will be described in more detail below, to the mirrors while watching the oscilloscope display. The alternating plateaus on the depth gauge create regions of imbalance on the oscilloscope output when the illuminating light beams are slightly out of alignment. Alignment is achieved when a balanced, maximum output in the center region of the oscilloscope is observed. Using a gauge with a white surface positioned in the middle of the track would not be as sensitive to slight misalignments. In a preferred embodiment, a primary beam, which illuminates the document from a thirty degree angle relative to normal, is fixed, and the secondary beam, which illuminates the document from a thirty degree angle symmetrically offset from normal with respect to the primary beam, is adjusted to line up with the primary using a first trunnion mirror. The reflected beam from the depth gauge is aligned with the center of the photodetector array using a second trunnion mirror.

Focussing the reflected light beam on the photodetector array is accomplished using a lens slidably mounted between the trunnion mirror and the photodetector array. When focussing, the depth gauge is replaced in the track by a focussing gauge. The focussing gauge has the same height and width dimensions as the depth gauge. In addition, the top, bottom, and side edges of the focussing gauge have a thickness equivalent to the distance between the track walls so that it fits snugly therein. The middle region of the focussing gauge has a thickness machined down to half the overall thickness of the focussing gauge. A series of black and white stripes are positioned on the focussing gauge up its height, The black and white stripes may be photographically reproduced and attached to the middle region of the focussing gauge, painted thereon, or supplied by some other suitable technique in operation, a technician moves the lens towards and away from the photodetector array while watching the oscilloscope. Focussing is achieved when a sinusoidal wave having a maximum peak to valley displacement is seen on the oscilloscope display. The peaks of the sinusoidal wave represent light reflected from the white stripes and the valleys represent the light reflected from the black stripes. The sinusoidal wave is the "beat frequency" between the black and white stripes on the focussing gauge and the discrete photodetectors on the photodetector array.

After the imaging system has been aligned and focussed, a white reference gauge's placed in the track in front of the window in the track wall. The white reference gauge has the same height and width dimensions as the depth and focussing gauges. Also, the white reference gauge has a thickness at its top, bottom and side edges which allows it to fit snugly within the track. The white reference gauge has a middle region with a thickness machined to a point less than the overall thickness of the gauge. In an exemplary environment where track is 80 mils wide, the white reference gauge would be 80 mils wide at its top, bottom, and side edges and the middle region would be machined down 0.015 inches to a thickness of 65 mils from the back surface of the gauge. The middle region has a white reflective coating. The white reflective coating can be provided by white paint, a chemical coating, or a white plastic material being attached to the gauge. In addition, the gauge itself could be constructed of a white plastic material or anodized aluminum, or any other suitable material. The white reference gauge is used to normalize the output from the photodetector array, i.e., the light detected by the photodetector array which is reflected from the white reference gauge represents a maximum amount of light which the imaging system will encounter when processing documents. The electronics of the imaging system used for capturing and processing the document images are normalized by treating signals received by the photodetector array which approach those obtained with the white reference gauge as background.

BRIEF DESCRIPTION OF THE DRAWINGS

The foregoing and other objects, aspects and advantages will be better understood from the following description of a preferred embodiment of the invention with reference to the drawings, in which:

FIG. 1 and 1a are partial, cut-away isometric view of the track in a high speed document handling system;

FIGS. 9a–9c are representational top views of the path of light travelled when the secondary beam is being aligned with the primary beam;

FIGS. 10a–10c are representational, partial side views of the alignments illustrated in FIGS. 9a–9c, respectively;

FIGS. 11a–11c are front views of oscilloscope displays which correspond to the output from the photodetector array as the secondary beam is aligned with the primary beam as shown in FIGS. 9a–9c, respectively;

DETAILED DESCRIPTION OF A PREFERRED EMBODIMENT OF THE INVENTION

Figure 2:
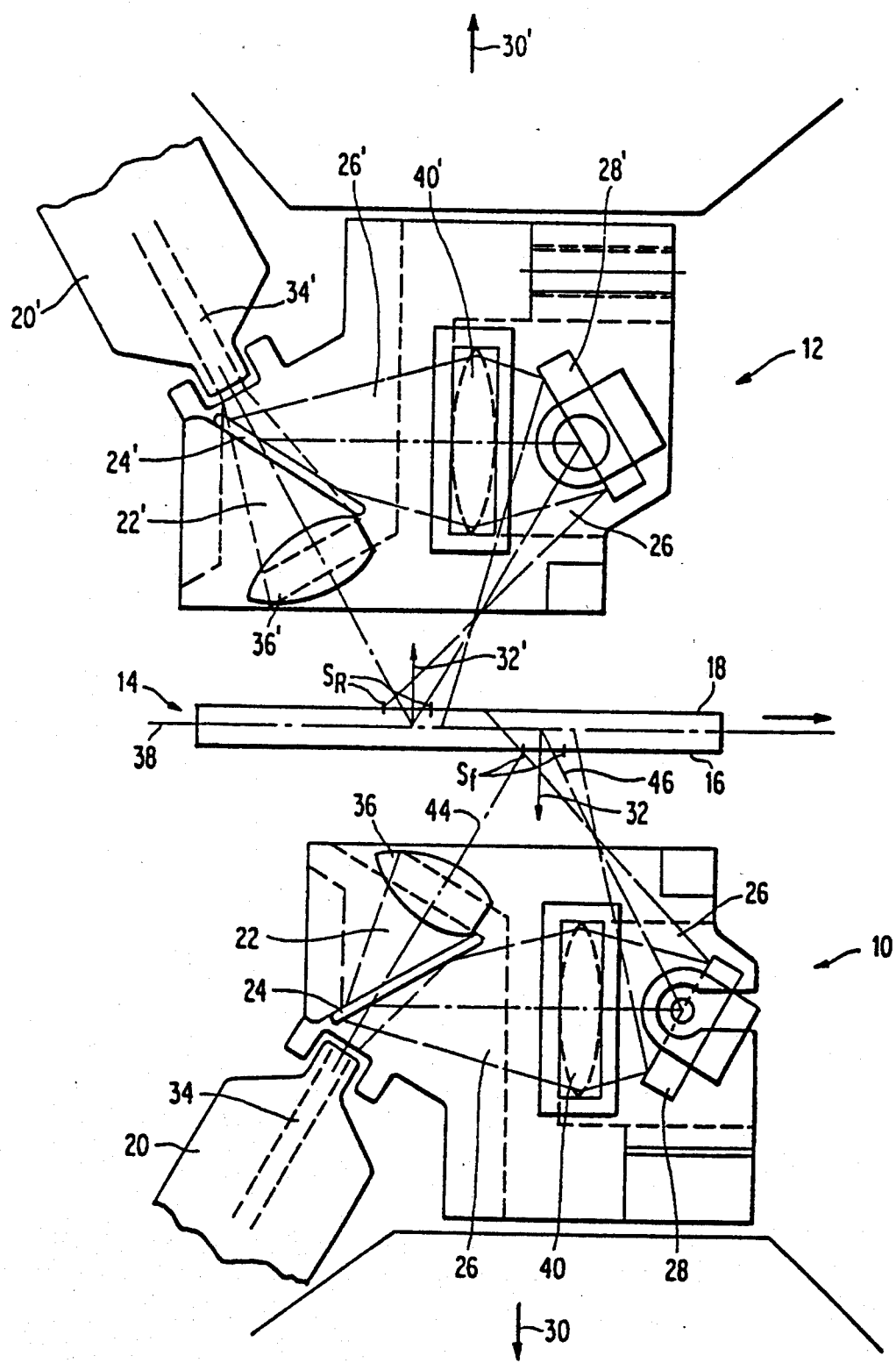
FIG. 2 is a representational top view of the front and rear imaging systems used in the high speed document handling system showing the paths of the two symmetrically offset illuminating beams and part of the path of the normally reflected beam.

Referring now to the drawings, and more particularly to FIG. 1, there is shown front and back imaging systems 10 and 12, respectively, positioned to illuminate and capture the image of documents (not shown) which travel through the track 14 at high speed. The track 14 is comprised of side walls 16 and 18 which are spaced approximately 80 mils apart. Each side wall 16 and 18 includes a rectangular window (not-shown) extending linearly from the top of the track 14 to the bottom of the track 14 through which a document in the track 14 can be imaged. The imaging systems 10 and 12 are linearly offset (shown more clearly in FIG. 2) along the length of the track 14 so that illumination light from one imaging system 10 or 12 does not interfere with reflected light which is to be detected by the opposite imaging system 10 or 12, i.e., the offset arrangement avoids a back lighting effect.

FIG. 2 shows a representational top view of the illumination part of the imaging systems 10 and 12, where each imaging system 10 and 12 is comprised of a fiber optic bundle 20 or 20' for projecting a primary light beam 22 or 22', toward the track 14, a beam splitter 24 or 24' which permits half of the primary light beam 52 or 22' to pass therethrough and reflects the other half (now called secondary light beam 26 or 26') to a trunnion mirror 28 or 28' which reflects the secondary light beam 26 or 26' towards the track 14, and a detecting system, shown generally as arrows 30 or 30' (described in more detail in connection with FIG. 3), which detects normally reflected light 32 or 32'. The fiber optic bundle 20 or 20' is comprised of a stack of optical fibers which produce a linear bar of light (FIG. 2 only showing the top fiber 34 or 34' and the linear bar extending down into the paper). The linear bar forming primary light beam 22 or 22' is tall enough to illuminate a document sent through track 14 from its top to its bottom. The primary light beam 22 or 22' which passes through beamsplitter 24 or 24' is focussed by condensing lens 36 or 36' for optimum illumination at the center line 38 of the track 14. The secondary light beam 26 or 26' reflected by beam splitter 24 or 24' is focussed for optimum illumination at the center line 38 of the track 14 by condensing lens 40 or 40'. Positioning the condensing lens 40 or 40' in the path of the secondary light 26 or 26' before the trunnion mirror 28 or 28' provides some advantages in the physical size of the imaging system 10 or 12.

This invention is particularly concerned with aligning the primary light beam 22 with the secondary light beam 26 and aligning and focussing the normally reflected beam 32 with the detecting system 30 (assume hereinafter that the same adjustments are made with respect to the rear imaging system 12). It is emphasized here again that the primary light beam 22, the secondary light beam, and the reflected beam 32 are each rectangular in shape so that a "slice" from the top to the bottom of a document travelling through track 14 is imaged. The basic concept for aligning the primary and secondary light beams 22 and 26 is best shown in FIG. 2 and the basic concept for aligning and focusing the reflected beam 32 with the detecting system 30 is best shown in FIG. 3.

In FIG. 2, the primary light beam 22 and secondary light beam 26 approach the track 14 from points symmetrically offset from a line normal to the track 14. Illuminating documents from symmetrically offset angles allows imaging the document with some depth of field which would not be achievable if the document were simply illuminated from one side. Imaging the documents using a system with depth of field is important since the distance between the front and back track walls 16 and 18, respectively, is considerably larger than the thickness of the document being imaged, i.e., the distance between the track walls 16 and 18 is preferably 80 mils while the thickness of a personal or cashiers check is on the order of 3 to 5 mils. In addition, shadowing effects caused by wrinkled documents are minimized or avoided by illuminating the document from opposite angles. In a preferred embodiment, the primary and secondary light beams 22 and 26, respectively, are symmetrically offset from the center line by approximately 30°. It has been found that making the offset angle wider, i.e., 45°, reduces the intensity of the reflected beam 32 to a point which is too low for adequate imaging by the detection system 30. In order to align the center line 44 of primary light beam 22 with the center line 46 of secondary light beam 26, the trunnion mirror 28 is rotated. This adjustment treats the primary light beam 22 as fixed, with the secondary light beam 26 being adjusted with respect to the primary light beam.

Figure 3:
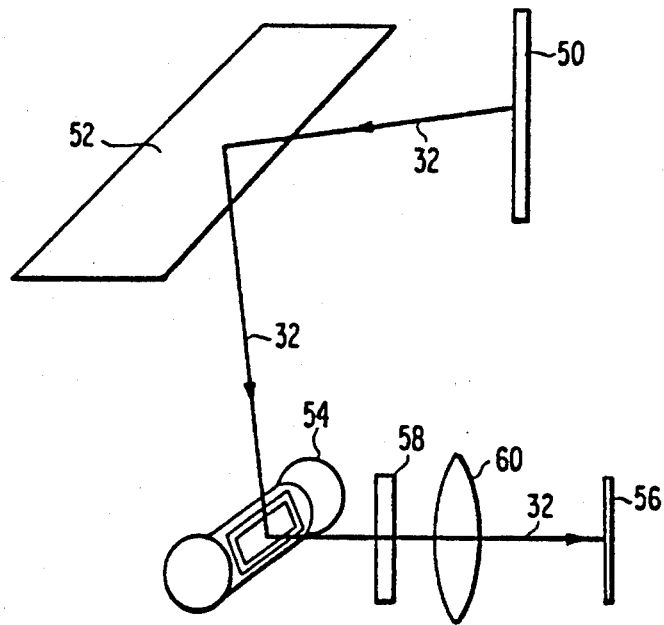
FIG. 3 is a schematic diagram showing the path of the normally reflected-beam towards the photodetector array.

In FIG. 3, the path of the normally reflected beam 32 in the detection system 30 is illustrated. The reflected beam 32 is shown in line form but in practice is actually a rectangular beam of light. The beam is reflected from the document 50 (which will be a gauge during the alignment and focussing procedures described below) towards an inclined mirror 52. The inclined mirror 52 directs the reflected beam 32 to a trunnion mirror 54 which reflects it towards a photodetector array 56. Before impinging on the photodetector array 56, the reflected beam 32 passes through a photopic filter 58 and an imaging lens 60. The photopic filter 58 is comprised of a plane glass plate with multiple layers of dielectric film formed thereon. The dielectric film layers act as optical coatings which are specially formulated to shape the spectral response of the system whereby the response of a human eye is approximated. The photodetector array 56 may be a charge coupled photodiode (CCPD) array which includes a plurality of rows of photodiodes arranged in the form of a rectangle. Alignment of the reflected beam 32 is achieved by rotating the trunnion mirror 54 until the reflectedbeam 32 impinges in the central part of the photodetector array 56. Focussing of the reflected beam 32 is achieved by moving the imaging lens 60 in a lateral direction toward and away from the photodetector array 56.

Figure 4A:
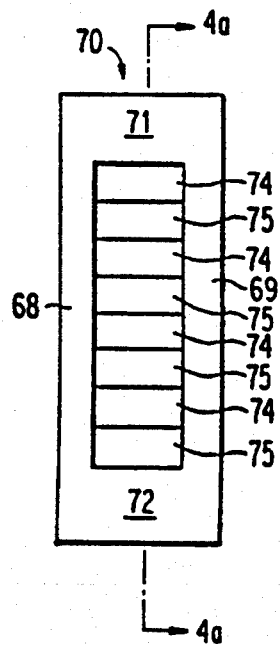
FIGS. 4a–b are front and cut-away side views, respectively, of the depth gauge.
Figure 4B:
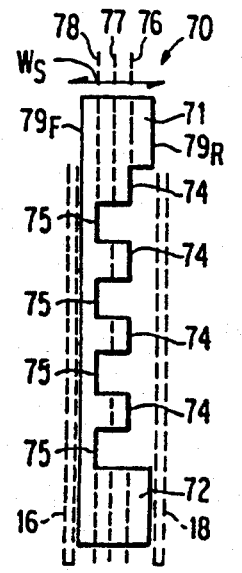
Figure 5A:
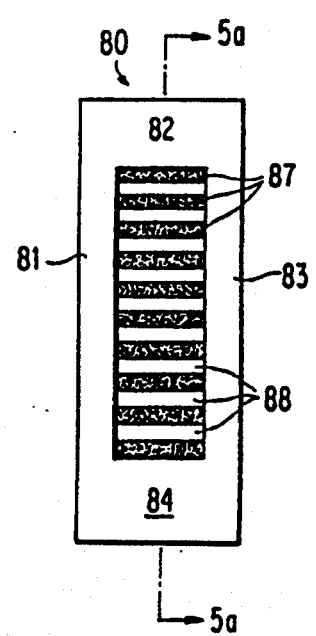
FIGS. 5a–b are front and cut-away side views, respectively, of the focussing gauge.
Figure 5B:
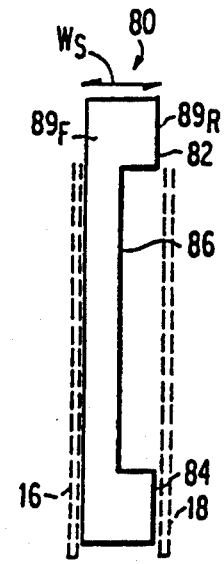
Figure 6A:
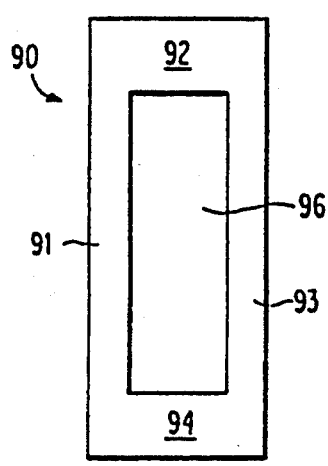
FIGS. 6a–b are front and cut-away side views, respectively, of the white reference gauge.
Figure 6B:
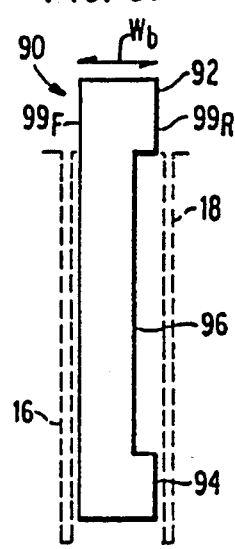

The present invention is particularly concerned with the use of a set of gauges to achieve proper alignment and focussing of the imaging systems 10 and 12 (shown in FIG. 1). FIGS. 4a and 4b show front and cut-away side views, respectively, of a depth gauge 70 which is used when aligning the reflected beam 32 with the photodetector array 56 (shown in FIG. 3) and when aligning the central part 46 of secondary beam 26 with the central part 44 of the primary beam 22 (shown in FIG. 2). FIGS. 5a and 5b show front and cut-away side views, respectively, of a focussing gauge 80 which is used when focussing the reflected beam onto the photodetector array 56 (shown in FIG. 3). FIGS. 6a and 6b show front and cut-away side views of a "white reference" gauge 90 which is used to normalize the output of the photodetector array 56. The cut-away side views of FIGS. 4b, 5b, and 6b are taken from lines 4a, 5a, and 6a, in FIGS. 4a, 5a, and 6a, respectively.

Referring now to FIGS. 4a and 4b, the depth gauge 70 is rectangular in shape and fits in the track 14 in front of the window for the imaging system 10 or 12. The depth gauge 70 is made from metal, plastic, or some other suitable material. The top and bottom ends, 71 and 72, respectively, and left and right sides, 68 and 69, respectively, of the depth gauge 70 are thick enough to fit snugly within .the track 14, i.e., in a preferred embodiment they are approximately 80 mils thick which is equivalent to the distance between the front and rear track walls, 16 and 18, respectively. The middle region of the depth gauge 70 is machined to have a series of thicker 74 and thinner 75 plateau areas which form stripes across the height of the depth gauge 70. The thicker 74 and thinner 75 plateau areas have a reflective coating positioned thereon. The reflective coating may be in the form of a white paint or chemical coating, a white plastic material affixed to the gauge, or any other suitable coating. The reflective surface on the thicker 74 and thinner 75 plateau areas could also be provided by constructing the gauge 70 from a white plastic material. The left and right sides 68 and 69 make the depth gauge 70 more rugged and help resist warping and bending in the middle region. In addition, the left and right sides 68 and 69 help prevent scraping of the reflective coatings on the thicker 74 and 75 thinner plateau areas when the depth gauge 70 is inserted or removed from the track.

The distance 76 between the center line 77 through the depth gauge 70 to the thicker plateau areas 74 is equal to the distance 78 between the center line 77 through the depth gauge 70 to the thinner plateau areas 75. In one embodiment, the center line 77 through the depth gauge 70 is 40 mils from the back, flat surface of the depth gauge 70, the thicker plateau areas 74 are 60 mils thick, and the thinner plateau areas 75 are 20 mils thick. It is contemplated that the thicker 74 and thinner 75 plateau areas could be machined to graduated thicknesses wherein each of the thicker 74 plateaus has a different, graduated thickness and each of the thinner 75 plateaus has a correspondingly thinner, graduated thickness.

Referring now to FIGS. 5a and 5b, the focussing gauge 80 is the same rectangular shape as the depth gauge 70 and is fabricated from the same or similar materials. The top and bottom ends, 82 and 84, respectively, and the left and right sides, 81 and 83, respectively, of the focussing gauge 80 are sized to fit snugly within the track 14, i.e., 80 mils in the preferred embodiment. The middle region 86 of the focussing gauge 80 is machined to a thickness equal to half the overall thickness of the gauge 80, i.e., 40 mils. A series of black 87 and white 88 stripes are positioned in the middle region 86 of the focussing gauge 80. The black 87 and white 88 stripes may be photographically reproduced and attached to the middle region 86, painted in the middle region, or supplied by some other suitable means.

Referring now to FIGS. 6a and 6b, the "white reference" gauge 90 is the same rectangular shape as the depth gauge 70 and the focussing gauge 80 and is fabricated from the same or similar materials. The top and bottom ends, 92 and 94, respectively, and the left and right sides, 91 and 93, respectively, of the "white reference" gauge 90 are sized to fit snugly within the track 14, i.e., 80 mils in a preferred embodiment. The middle region 96 is machined down to a level slightly less than the overall thickness of the gauge 90, i.e., in a preferred embodiment it is machined down 15 mils from the 80 mils thickness of the gauge 90 to a thickness of 65 mils. The middle region 96 has a highly reflective white coating such as white paint, an attached white plastic material, or any other suitable coating.

Referring back to FIGS. 1 through 3, alignment and focussing of the imaging system 10 or 12 is a three step procedure. In each step, the photodetector array 56 is connected to an oscilloscope and the intensity of the light impinging on the individual photodetectors in the array is shown as a wave on the oscilloscope display. First, the depth gauge 70 is placed in the track 14 in front of the window for the particular imaging system 10 or 12.being adjusted and the reflected beam 32 is aligned with the photodetector array 56. In the first step, only the primary beam 22 or 22' is used to illuminate the depth gauge 70. The secondary beam 26 or 26' is eliminated simply by turning trunnion mirror 28 or 28' out of the way. The trunnion mirror 54 is then rotated so as to reflect the reflected beam 32 towards the photodetector array 56. Alignment of the reflected beam 32 is achieved when it impinges on the active part of photodetector array 56. Second, while the depth gauge 70 is still in place, the trunnion mirror 28 is then rotated back and is used to reflect the secondary beam 26 or 26' towards the track 14. Alignment of the secondary beam 26 is achieved when the central portion 46 of the secondary beam 26 coincides with the central portion 44 of the primary beam 22. Third, the focussing gauge 80 replaces the depth gauge 70 in the track 14 and the reflected beam 32 is focussed on the photodetector array 56 by laterally sliding the imaging lens 60 towards and away from the photodetector array 56. Focussing of the reflected beam 32 is achieved when a maximum intensity variation between the light reflected from the white stripes 88 and the light reflected from the black stripes 87 is achieved.

Figure 7A:
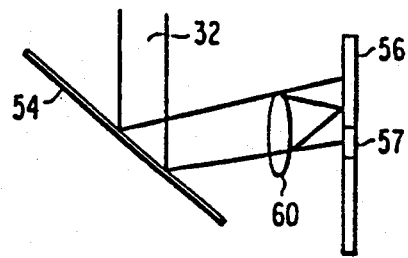
FIGS. 7a–c are representational side views of the path of a reflected beam when the depth gauge is placed in the track and the primary beam is being aligned with the reflected beam.
Figure 8A:
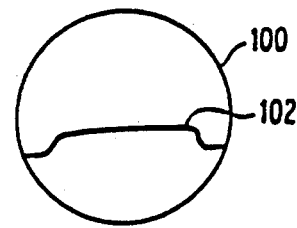
FIGS. 8a–8c are front views of oscilloscope displays which correspond to the output from the photodetector arrays shown in FIGS. 7a–7c, respectively.
Figure 7B:
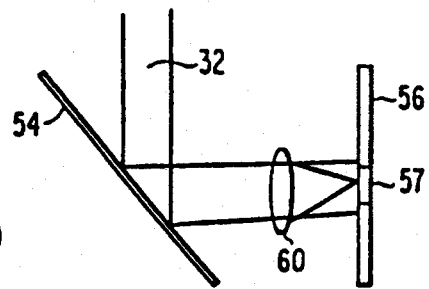
Figure 8B:
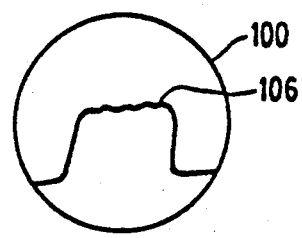
Figure 7C:
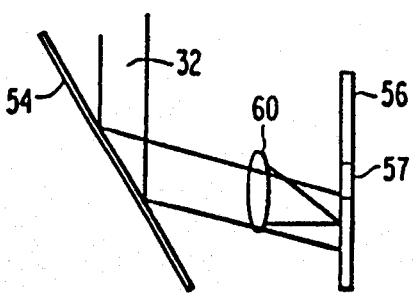
Figure 8C:
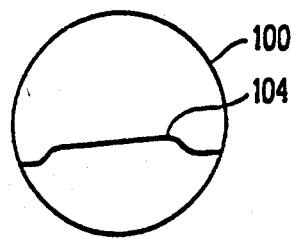

FIGS. 7a-7c and 8a-8c illustrate the alignment procedure for aligning the reflected light beam 32 with the active part 57 of photodetector array 56. Comparison to FIGS. 2, 3, 4a and 4b may be helpful in explaining the alignment procedure. Reflected light beam 32 represents the light reflected normally from the surface of depth gauge 70 positioned in the track 14 when it is illuminated with a rectangular light beam (i.e., primary light beam 22) from a 30° angle. Secondary light beam 26 has been eliminated as an illumination source by rotating trunnion mirror 28 out of the way. FIG. 7a shows that if the reflected light beam 32 intersects the trunnion mirror 54 at too wide an angle the reflected light beam 32 will impinge above and away from the active part 57 of the photodetector array 56. FIG. 8a shows an oscilloscope display 100 of the electrical signals 102 output from the photodetectors in the photodetector array 56 when the trunnion mirror 54 is positioned as shown in FIG. 7a. FIGS. 7c and 8c shows a similar result to that shown in FIGS. 7a and 8a. In FIG. 7c, the reflected light beam 32 intersects the trunnion mirror 54 at too narrow of an angle and is directed below the active portion 57 of the photodetector array 56. FIG. 8c shows an oscilloscope display 100 of the electrical signals 104 output from the photodetectors in the photodetector array 56 when the trunnion mirror 54 is positioned as shown in FIG. 7a.

FIGS. 7b and 8b show the position of the trunnion mirror 54 and the electrical signals 106 output on the oscilloscope display 100 when the reflected light beam 32 is properly aligned. FIG. 7b shows the reflected light beam 32 is directed by the trunnion mirror 54 towards the active part 57 of the photodetector array 56. FIG. 8b shows the electrical signals 106 on the oscilloscope 100 are much more intense compared with the signals 102 and 104, indicated in FIGS. 8a and 8c, respectively, because the active part 57 of the photodetector array 56 directly receives more intense light. Even when the reflected light beam 32 is incident on the active part 57 of the photodetector array 56, the high intensity signals 106 may not be perfectly level. This is because the plateaus 74 and 75 on the depth gauge 70 may not be equally illuminated at the particular part of the depth gauge 70 imaged onto the photodetector array 56. Small adjustments of the trunnion mirror 54 can be made to image the part of the depth gauge 70 which is illuminated equally on plateaus 74 and 75. At this position of the trunnion mirror 54, the light 32 imaged onto the photodetector array 56 will not only be highest but also most uniform. At this position of the trunnion mirror 54, the light imaged onto the photodetector array 56 is coming from the part of the track which is most uniformly illuminated by the primary beam 22; i.e., the illumination of the document will be maximized, and as near as possible, the same, whether the document passes through near the front 16 of the track 14 or near the back 18 of the track 14.

FIGS. 9a–9c, 10a–10c and 11a–11c illustrate this principle in more detail, with specific reference to the procedure for aligning the secondary beam 26 with the primary beam 22.

Comparison with FIGS. 2, 4a, and 4b may be helpful in explaining this alignment procedure. The depth gauge 70 is positioned in the track 14 and is illuminated by both the primary and secondary light beams, 22 and 26, respectively, i.e., the trunnion mirror 28 is rotated to reflect the secondary beam 26 towards the track 14. The objective is to align the central portion 46 of the secondary beam 26 with the central portion 44 of the primary beam 22. FIGS. 9a–9c and 10a–10c respectively show top and front side views of the depth gauge 70 positioned in the track 14. FIGS. 9a–9c show arrows 150 and 160 directed towards the track 14 which represent the central portion 44 of the primary beam 22 and the central portion 46 of the secondary beam 26, respectively, and an arrow 170 directed away from the track which represents the normally reflected light beam 32. FIGS. 9a and 9c show smaller arrows 172 and 174, respectively, which represent light reflected by only part of the plateaus 74 and 75 of the depth gauge 70. As discussed in connection with FIG. 4b, the depth gauge 70 has machined therein a horizontally striped pattern of alternating plateau regions 74 and 75 of thicker and thinner depths.

Referring now to FIGS. 2 and 10a–10c, the primary light beam 22 of FIG. 2 is shown in FIGS. 10a–10c as a series of arrows 151–156 and the secondary light beam 26 of FIG. 2 is shown in FIGS. 10a–10c as a series of arrows 161–166. As discussed above, both the primary and secondary light beams, 22 and 26, respectively, are rectangular in shape. A vertical portion of the depth gauge 70 is exposed through the window opening, defined by lines 200 and 202, of the front wall 16 of the track 14. Each arrow 151–156 and 161–166 is representative of the central region 44 or 46, respectively, of the primary and secondary light beams 22 and 26 at a particular height on the depth gauge 70. FIG. 10b shows the light beams represented by arrows 161–166 perfectly aligned with the light beams represented by arrows 151–156. The condition shown in FIG. 10b is ideal and represents a situation when the secondary beam 26 is in perfect alignment with the primary beam 22. When comparing FIGS. 9b and 10b, a strong, normally reflected light beam 170 will be detected by the photodetector array 56 (shown in FIG. 3) because the point at which the arrows 151–156 and 161–166 strike each of the plateaus 74 and 75 is aligned with the active portion 57 of the photodetector array 56. Both FIGS. 10a and 10c show the light beams represented by arrows 161–166 out of alignment with the light beams represented by arrows 151–156. The conditions shown in FIGS. 10a and 10c represent situations where the secondary beam 26 is directed too far to the left or too far to the right, respectively, and is out of alignment with the primary beam 22.

Referring to FIG. 10a, the light beams represented by arrows 161, 163, and 165 are directed to points toward the left 200 of the window 200–202, while the light beams represented by arrows 162, 164, and 166 are directed to points nearer the center of the window 200–202. The condition illustrated by FIG. 10a occurs because the thicker plateaus 74 are physically closer to the window 200–202 opening than the thinner plateaus 75. Comparing FIG. 10a with FIG. 9a, it is apparent that some light 172 will be reflected back through the window 200–202 from the thicker plateaus 74, i.e., light from the light beams represented by arrows 162, 164, and 166. The light from light beams 161, 163, 165, which are directed towards the thinner plateaus 75, Will be reflected back through the window 200–202; however, the light will be shifted to the left and not aligned with the active area on the photodetector array 56. The photodetector array 56 (shown in FIG. 3) detects both the light 172 reflected from light beams 162, 164, and 166 and the light 170 reflected from the primary beam 22.

Referring to FIG. 10c, the opposite condition of that shown in FIG. 10a is illustrated. In FIG. 10c, the light beams represented by arrows 162, 164, and 166 are directed to points toward the right 202 of window 200–202, while the light beams represented by arrows 161, 163, and 165 are directed to points nearer the center of the window 200–202. Like the condition illustrated in FIG. 10a, the condition illustrated in FIG. 10c occurs because of the differing thicknesses of the plateau areas 74 and 75. Comparing FIG. 10c with FIG. 9c, it is apparent that some light 174 will be reflected back through the window 200–202 from the thinner plateaus 75, i.e., light from the light beams represented by arrows 161, 163, and 165. Conversely, the light from light beams 162, 164, 166, which are directed towards the thicker plateaus 74, will be reflected back through the window 200–202, but it will be shifted to the right and not aligned with the active area on the photodetector array 56. The photodetector array 56 (shown in FIG. 3) detects both the light 174 reflected from light beams 161, 163, and 165 and the light 170 reflected from the primary beam 22.

FIGS. 11a–11c illustrate the electrical signal output from the photodetector array 56 (shown in FIG. 3) on an oscilloscope display 210 when the secondary beam 26 is being aligned with the primary beam 22. Comparing FIGS. 9a, 10a, and 11a, it is apparent that the intensity of the light reflected from the thicker plateau areas 74 of the depth gauge 70 is far greater than the intensity of the light reflected from the thinner plateau areas 75. This is because the thicker plateau areas 74 are reflecting some of the light 172 from the secondary beam 26 (represented by arrows 162, 164, and 166) in addition to the reflected light 170 from the primary beam 22, while the thinner plateau areas 75 do not reflect the secondary light 26 back to the active area of the photodetector array 56. FIG. 11a illustrates that when the secondary beam 26 is directed too far to the left, a toothed output 212 will be shown on the oscilloscope display 210 where peaks 214 represent the additional light 172 reflected from the thicker plateau areas 74 and the valleys 216 represent the lack of reflected light from the thinner plateau areas 75. Likewise, when comparing FIGS. 9c, 10c, and 11c it is apparent that the intensity of the light reflected from the thinner plateau areas 75 of the depth gauge 70 is far greater than the intensity of the light reflected from the thicker plateau areas 74. This is because the thinner plateau areas 75 are reflecting some of the light 174 from the secondary beam 26 (represented by arrows 161, 163, and 165) in addition to the reflected light 170 from the primary beam 22, while the thicker plateau areas 74 do not reflect the secondary light 26 back to the active area of the photodetector at ray 56. FIG. 11c illustrates that when the secondary beam 26 is directed too far to the right, a toothed output 220 will be shown on the oscilloscope display 210 where peaks 222 represent the additional light 174 reflected from the thinner plateau areas 75 and the valleys 224 represent the lack of reflected light from the thicker plateau areas 75.

The perfect alignment condition is illustrated with FIGS. 9b, 10b, and 11b. In FIG. 11b, the oscilloscope display 210 shows a nearly flat (across the top) output 230 from the photodetector array 56 (shown in FIG. 3) when the light beams represented by arrows 161–166 are aligned with the light beams represented by arrows 151–156 as shown in FIG. 10b. When the primary and secondary light beams, 22 and 26, respectively, are aligned, the reflected beam 32 (shown in FIGS. 2 and 3 and discussed as light beam 170 in FIG. 9b) has its maximum intensity since light from two sources is being reflected.

FIGS. 12a–12c and 13a–13c illustrate the procedure for focussing the reflected light beam 32 on the photodetector array 56. Reference back to FIGS. 2, 3, 5a, and 5b will aid in understanding this explanation. The focussing step is performed after alignment of the reflected beam 32 relative to the photodetector array 56 has occurred
(discussed above in conjunction with FIGS. 7a–7c and 8a–8c),i.e., the focussing step may be performed before or after aligning the primary and secondary light beams, 22 and 26, respectively (discussed above in conjunction with FIGS. 9a–9c, 10a–10c, and 11a–11c). It is also possible to use an iterative procedure in which the alignment steps and the focussing steps are repeated until a satisfactory optimum is obtained.

Figure 12A:
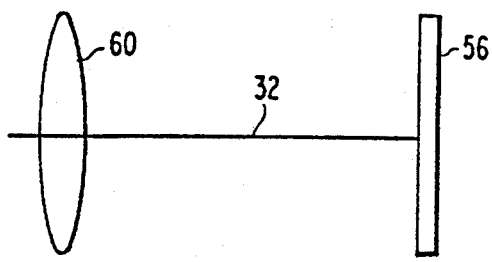
FIGS. 12a–12c are schematic diagrams showing the movement of the focusing lens for focusing the reflected light onto the photodetector array.
Figure 12B:
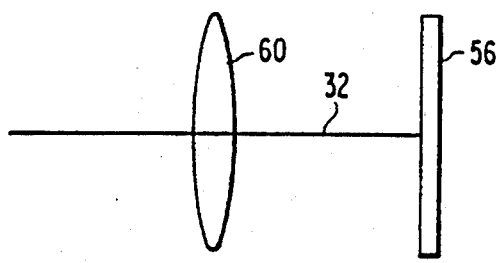
Figure 12C:
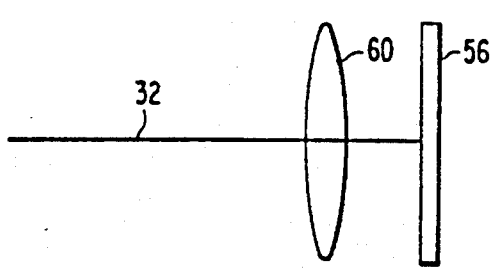
Figure 13A:
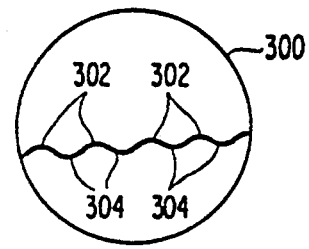
FIGS. 13a–13c are front views of the oscilloscope displays which correspond to the output from the photodetector array as the focusing lens is moved in the manner shown in FIGS. 12a–12c, respectively.
Figure 13B:
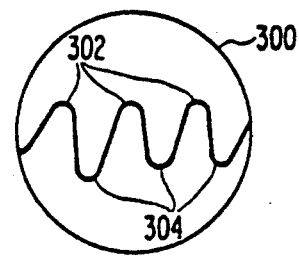
Figure 13C:
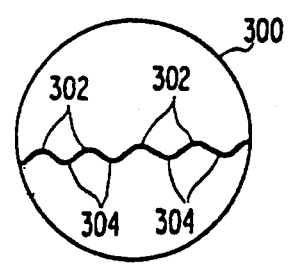

To perform the focussing step, the focussing gauge 80 (shown in FIGS. 5a and 5b) replaces the depth gauge 70 in the track 14. Focussing is achieved by moving imaging lens 60 laterally toward and away from the photodetector array while observing the measured intensity of the reflected light 32 from the black 87 and white 88 striped pattern on the focussing gauge 80 on the oscilloscope display 300. On the oscilloscope display 300, the peaks 302 represent light reflected from a white stripe 88 and the valleys 304 represent light reflected from a black stripe 87. Focussing is achieved when a maximum difference exists between the peaks 302 and valleys 304. FIGS. 12a and 13a show that when the imaging lens 60 is too far from the photodetector array 56, the reflected beam 32 is out of focus (i.e., focussed to a point in front of the photodetector array) and the intensity of the peaks 302 is not very much greater than the valleys 304. FIGS. 12c and 13c show that when the imaging lens 60 is too close to the photodetector array 56, the reflected beam 32 is out of focus (i.e., focussed to a point behind the photodetector array) and the intensity of the peaks 302 is not very much greater than the valleys 304. FIGS. 12b and 13b illustrate the condition when the reflected beam 32 is focussed properly. When the imaging lens 60 is positioned the right distance away from the photodetector array, the reflected beam 32 will be focussed directly on the photodetector array 56. FIG. 13b shows that when the reflected beam 32 is precisely focussed, the oscilloscope display 300 shows a maximum difference between the peak 302 and valley 304 intensities. The frequency of the peaks 302 and the valleys 304 may not correspond to the frequency of the black 87 and white 88 stripes on the focussing gauge 80. This is a well known effect in imaging systems which use an array of discrete detectors to image repetitive patterns, and is referred to in the literature as "aliasing", "beat frequency", or "Moire effect frequency". The principle is still valid that the difference between the peaks and the valleys should be maximized for the best image focus.

Figure 14A:
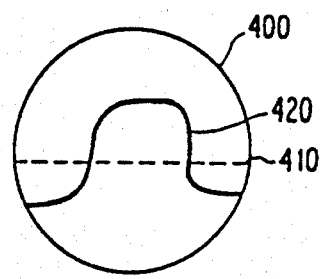
FIGS. 14a–14b are front views of oscilloscope displays which correspond to favorable and unfavorable output from the photodetector array when the white reference gauge is placed in the track.
Figure 14B:
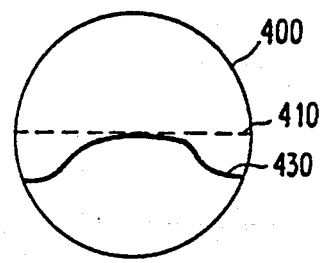

After the imaging system 10 or 12 (shown in FIG. 1) has been aligned and focussed, the "white reference" gauge (shown in FIGS. 6a and 6b) is inserted in the track 14 (shown in FIG. 2) so that the output from the photodetector array 56 (shown in FIG. 3) can be normalized. Normalization is a well known practice where the intensity output from a detector is compared to a reference amount. Normalization recognizes that the signal from a uniform document will not be the same from each element of the detector array. This lack of signal uniformity may be caused by the illumination of the document not being perfectly uniform, the photodetector elements in the photodetector array having different sensitivities, the signal processing electronics being different for different parts of the photodetector array, or the imaging lens producing some shading of the image. The normalization process measures for each photodetector information channel in the array, the signal from a "black" document or test piece and the signal from a "white" reference document or test piece. Signals measured from the real documents being processed during the operation of the document processor are compared with the reference measurements. Typically, the black reference signal will be subtracted from the measured signal and the result will be expressed as a fraction of the difference between the white and black reference signals. In the present application, the intensity of light received by the photodetector array 56 when the "white reference" gauge 90 is in the track 14 will be used as the reference amount. The purpose of normalization is to improve the response of the imaging system 10 or 12 to writing on a document relative to the background, i.e., the background will be subtracted out using the reference response. FIG. 14a shows that an optimum response curve 400 will rise above a threshold value 410 on the oscilloscope display 420, while FIG. 14b shows that an inferior response curve 430 will not rise above the threshold value 410.

While the invention has been described in terms of a preferred embodiment where a set of three track gauges are used to align, focus and normalize an imaging system in a high speed document handling device, those skilled in the art will recognize that the invention can be practiced with modification within the spirit and scope of the appended claims.

Having thus described our invention, what we claim as new and desire to secure by Letters Patent is as follows:

1. A method for aligning an imaging system in a high speed document processor, comprising the steps of:
    placing a depth gauge within a track through which items are passed at high speeds in front of a window open to said imaging system;
    connecting an oscilloscope to a photodetector array in said imaging system;
    illuminating said depth gauge; and
    adjusting a path of a beam of light reflected from said depth gauge to fall on an active area of said photodetector array of said imaging system, said step of adjusting being accomplished by rotating a mirror positioned in said path of said beam of light before said photodetector array while observing a display on said oscilloscope, said beam of light reflected from said depth gauge being aligned when said display on said oscilloscope shows a maximum intensity.

2. A method for aligning beams of light in an imaging system in a high speed document processor, comprising the steps of:
    placing a depth gauge within a track through which items are passed at high speeds in front of a window open to said imaging system;
    connecting an oscilloscope to a photodetector array in said imaging system;
    illuminating said depth gauge with a first beam of light, said first beam of light being offset from a line normal to said depth gauge;
    aligning a second beam of light reflected from said depth gauge with said photodetector array in said imaging system, said second beam of light being comprised of light reflected from at least two plateaus formed in a front portion of said depth gauge, a first plateau being positioned a first distance from a back portion of said gauge which is a fixed amount less than a second distance between said back portion of said gauge and a plane running through a vertical axis of said gauge, a second plateau being positioned a third distance from said back portion of said gauge which is said fixed amount more than said second distance, said step of aligning being completed when a maximum intensity of light received by said photodetector array is observed on a display of said oscilloscope;
    illuminating said depth gauge with a third beam of light, said third beam of light being symmetrically offset from said line normal to said depth gauge relative to said first beam of light; and
    adjusting a path of said third beam of light to illuminate said depth gauge by rotating a mirror positioned in said path of said third beam of light between a source of said third beam of light and said depth gauge while observing a display of said oscilloscope, said step of adjusting being accomplished when said oscilloscope display shows said second beam of light has a relatively uniform 3. A method of normalizing with lens means of an imaging system on a linear sensor having a prescribed number of like cells, in a high speed document processor, this method comprising:
    providing a white reference normalization gauge having frame means of prescribed width surrounding a reference zone with height and width dimensions larger than a rectangular window in a track of said high speed document processor, said rectangular window being arranged to allow said imaging system to image items within said track; said frame means being dimensioned to hold said gauge snugly within said track;
    providing a plateau formed in a front portion of said gauge, said plateau being positioned a first distance from a back portion of said gauge which is a fixed amount less than the width of said track; and
    providing a white reflective coating formed on said plateau.

4. A method of aligning an illumination arrangement as a high speed document processor for transporting documents along a track means of prescribed constant track width, many times the width of said documents, said track means including at least one rectangular window means cut into said track means and defining an illumination site of prescribed uniform height and width, said documents being prone to pass said window means at varying positions across said track width, said method comprising:
    providing depth gauge means including frame means surrounding a relatively rectangular gauge-locus which surrounds said illumination site, while adapting said frame means for selective, removable insertion into said track means at a said window means so as to firmly position said gauge-locus at a said site, with the height and width of the gauge-locus spanning the height and width of said window means;
    arranging said gauge-locus to be characterized by at least two sets of reflecting plateaus all disposed on a common base plane, each plateau set being relatively uniformly projected across at least one dimension of said locus, each plateau being formed to present a reflecting surface having a prescribed respective constant height above said base plane, and aligning the beams with said gauge means at various document locations across the track width.

5. The method of claim 4, wherein one said number of reflecting surfaces is arranged to have a uniform height above said base plane which is somewhat more than half the width of said track means and wherein another said number of reflecting surfaces is arranged to have a uniform height which is somewhat less than half the width of said track means, whereby to simulate two different document positions across the width of said track means.

6. The method of claim 4, wherein all said reflecting surfaces are finished and coated to exhibit high reflectance to spectral light beams incident oblique thereto.

7. A method of focussing lens means of an imaging system on a linear sensor having a prescribed number of like cells, in a high speed document processor, this method comprising:
    providing a gauge having frame means of prescribed width surrounding a reference zone with height and width dimensions larger than a rectangular window in a track of said high speed document processor, said rectangular window being made to allow said imaging system to image items within said track; said frame means being dimensioned to hold said gauge snugly within said track;

arranging a plateau formed in a front portion of said gauge, said plateau being positioned a first distance from the back of said gauge, this distance being a fixed amount less than the width of said track; and providing a black and white stripe pattern positioned on said plateau, said black stripes arranged to have a predetermined width related to the size of said sensor cells, whereby precise focussing with said lens means can yield a "Moire" intensity pattern.

* * * * *